(12) United States Patent
Wigen et al.

(10) Patent No.: US 11,237,031 B2
(45) Date of Patent: Feb. 1, 2022

(54) ADDITIVELY MANUFACTURED HEATERS FOR AIR DATA PROBES HAVING A HEATER LAYER AND A DIELECTRIC LAYER ON THE AIR DATA PROBE BODY

(71) Applicant: Rosemount Aerospace Inc., Burnsville, MN (US)

(72) Inventors: Scott Wigen, Eagan, MN (US); Greg Allen Seidel, Farmington, MN (US); Ram Ranjan, West Hartford, CT (US); Timothy Thomas Golly, Lakeville, MN (US); Wayde R. Schmidt, Pomfret Center, CT (US); Sameh Dardona, Thuwal (SA); Slade R. Culp, Coventry, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/545,591

(22) Filed: Aug. 20, 2019

(65) Prior Publication Data

US 2021/0055143 A1 Feb. 25, 2021

(51) Int. Cl.
*G01F 1/46* (2006.01)
*G01P 13/02* (2006.01)
*B33Y 10/00* (2015.01)
*B64D 15/12* (2006.01)

(52) U.S. Cl.
CPC .............. *G01F 1/46* (2013.01); *G01P 13/025* (2013.01); *B33Y 10/00* (2014.12); *B64D 15/12* (2013.01)

(58) Field of Classification Search
None
See application file for complete search history.

(56) References Cited

U.S. PATENT DOCUMENTS

| | | | |
|---|---|---|---|
| 2,984,107 | A | 5/1961 | Strieby et al. |
| 4,357,526 | A | 11/1982 | Yamamoto et al. |
| 5,127,265 | A | 7/1992 | Williamson et al. |
| 5,628,565 | A | 5/1997 | Hagen et al. |
| 5,750,958 | A | 5/1998 | Okuda et al. |
| 6,049,065 | A | 4/2000 | Konishi |
| 6,070,475 | A | 6/2000 | Muehlhauser et al. |
| 6,236,027 | B1 | 5/2001 | Miyata et al. |
| 6,517,240 | B1 | 2/2003 | Herb et al. |
| 6,892,584 | B2 | 5/2005 | Gilkison et al. |
| 8,242,416 | B2 | 8/2012 | Lin et al. |

(Continued)

FOREIGN PATENT DOCUMENTS

| | | |
|---|---|---|
| EP | 3133403 A1 | 2/2017 |
| GB | 2561393 A | 10/2018 |

(Continued)

OTHER PUBLICATIONS

Extended European Search Report for European Patent Application No. 19215832.7, dated Aug. 10, 2020, 8 pages.

(Continued)

*Primary Examiner* — Harshad R Patel
(74) *Attorney, Agent, or Firm* — Kinney & Lange, P.A.

(57) ABSTRACT

An air data probe includes an air data probe body and an additively manufactured heater on the air data probe body, the heater including a first heater layer and a first dielectric layer on the first heater layer. The first dielectric layer makes up an exterior surface of the heater.

12 Claims, 14 Drawing Sheets

(56) References Cited

U.S. PATENT DOCUMENTS

| | | |
|---|---|---|
| 9,097,734 B2 | 8/2015 | Seaton et al. |
| 9,207,253 B2 | 12/2015 | Seidel et al. |
| 9,664,542 B2 | 5/2017 | Gordon et al. |
| 9,719,820 B1 | 8/2017 | Jacob et al. |
| 10,197,588 B2 | 2/2019 | Wong et al. |
| 10,234,475 B2 | 3/2019 | Samo et al. |
| 10,494,107 B2 | 12/2019 | Dardona et al. |
| 10,578,498 B2 | 3/2020 | Parsons et al. |
| 10,605,637 B2 | 3/2020 | Gordon et al. |
| 10,884,014 B2 | 1/2021 | Golly et al. |
| 10,955,433 B2 | 3/2021 | Jacob et al. |
| 2007/0045477 A1 | 3/2007 | Armstrong et al. |
| 2007/0108047 A1* | 5/2007 | Chang ................ G01N 27/4075 204/400 |
| 2010/0032292 A1* | 2/2010 | Wang ................ G01N 27/4075 204/431 |
| 2011/0240625 A1 | 10/2011 | Takenouchi |
| 2012/0118076 A1 | 5/2012 | Foster |
| 2013/0287378 A1 | 10/2013 | Kida et al. |
| 2014/0042140 A1 | 2/2014 | Lin et al. |
| 2014/0042149 A1 | 2/2014 | Kamitani |
| 2014/0116154 A1 | 5/2014 | Seidel et al. |
| 2014/0285943 A1 | 9/2014 | Watanabe et al. |
| 2016/0280391 A1 | 9/2016 | Golly et al. |
| 2016/0304210 A1 | 10/2016 | Wentland et al. |
| 2017/0129616 A1 | 5/2017 | Coat-Lenzotti et al. |
| 2018/0079525 A1 | 3/2018 | Krueger et al. |
| 2018/0124874 A1 | 5/2018 | Dardona et al. |
| 2018/0128849 A1 | 5/2018 | Wong et al. |
| 2018/0160482 A1 | 6/2018 | Hartzler et al. |
| 2018/0238723 A1 | 8/2018 | Seidel et al. |
| 2018/0259547 A1 | 9/2018 | Abdullah et al. |
| 2018/0281279 A1 | 10/2018 | Barocio et al. |
| 2018/0372556 A1 | 12/2018 | Parsons et al. |
| 2018/0372559 A1 | 12/2018 | Parsons et al. |
| 2019/0001787 A1 | 1/2019 | Takeuchi |
| 2019/0219611 A1 | 7/2019 | Lyding et al. |
| 2019/0293676 A1* | 9/2019 | Jacob .................... B22F 3/1055 |
| 2020/0055582 A1* | 2/2020 | Botura .................... B64C 27/00 |

FOREIGN PATENT DOCUMENTS

| | | |
|---|---|---|
| KR | 20120069201 A | 6/2012 |
| KR | 101184780 B1 | 9/2012 |

OTHER PUBLICATIONS

Extended European Search Report for European Patent Application No. 20205705.5, dated Apr. 30, 2021, 10 pages.

* cited by examiner

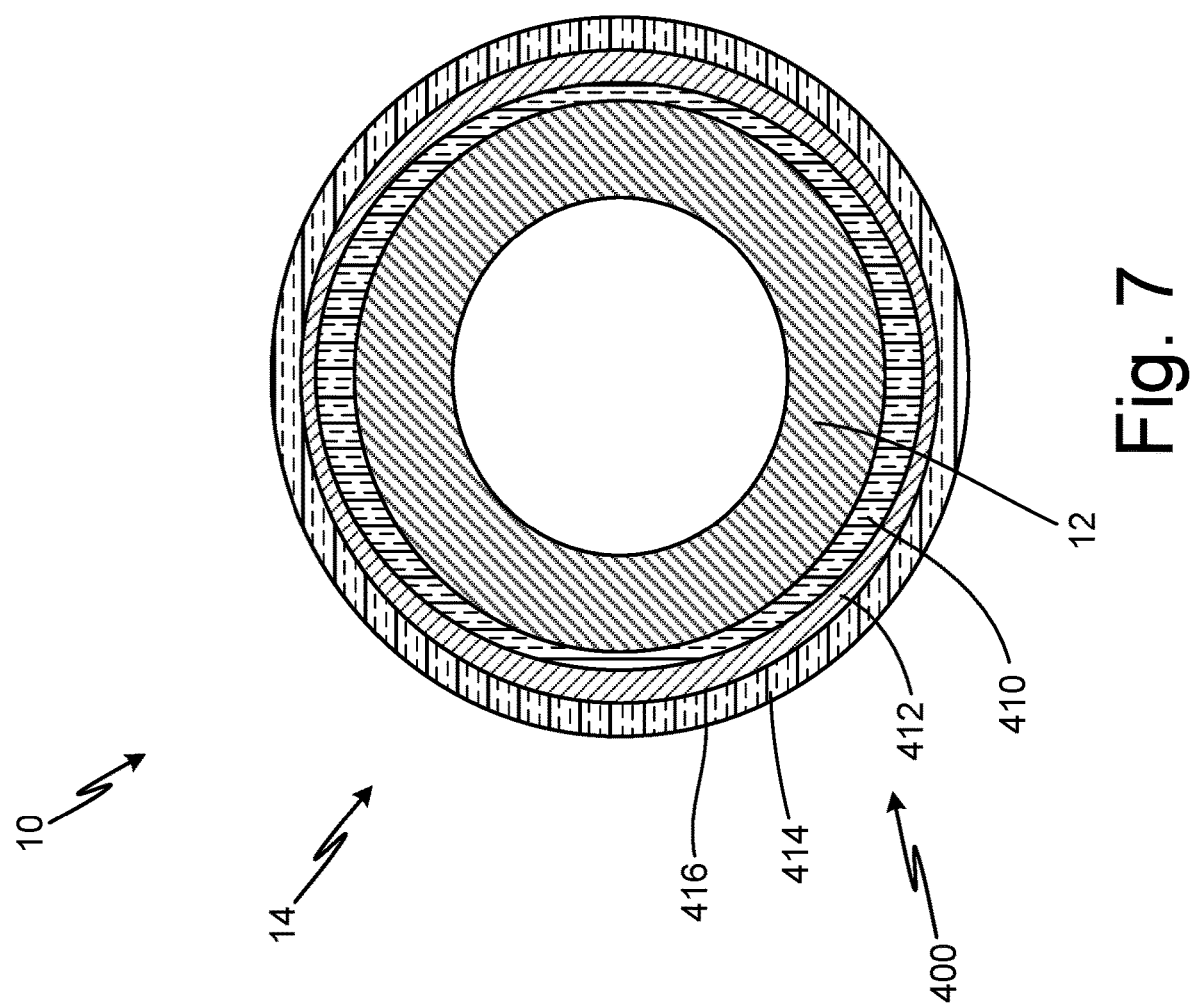

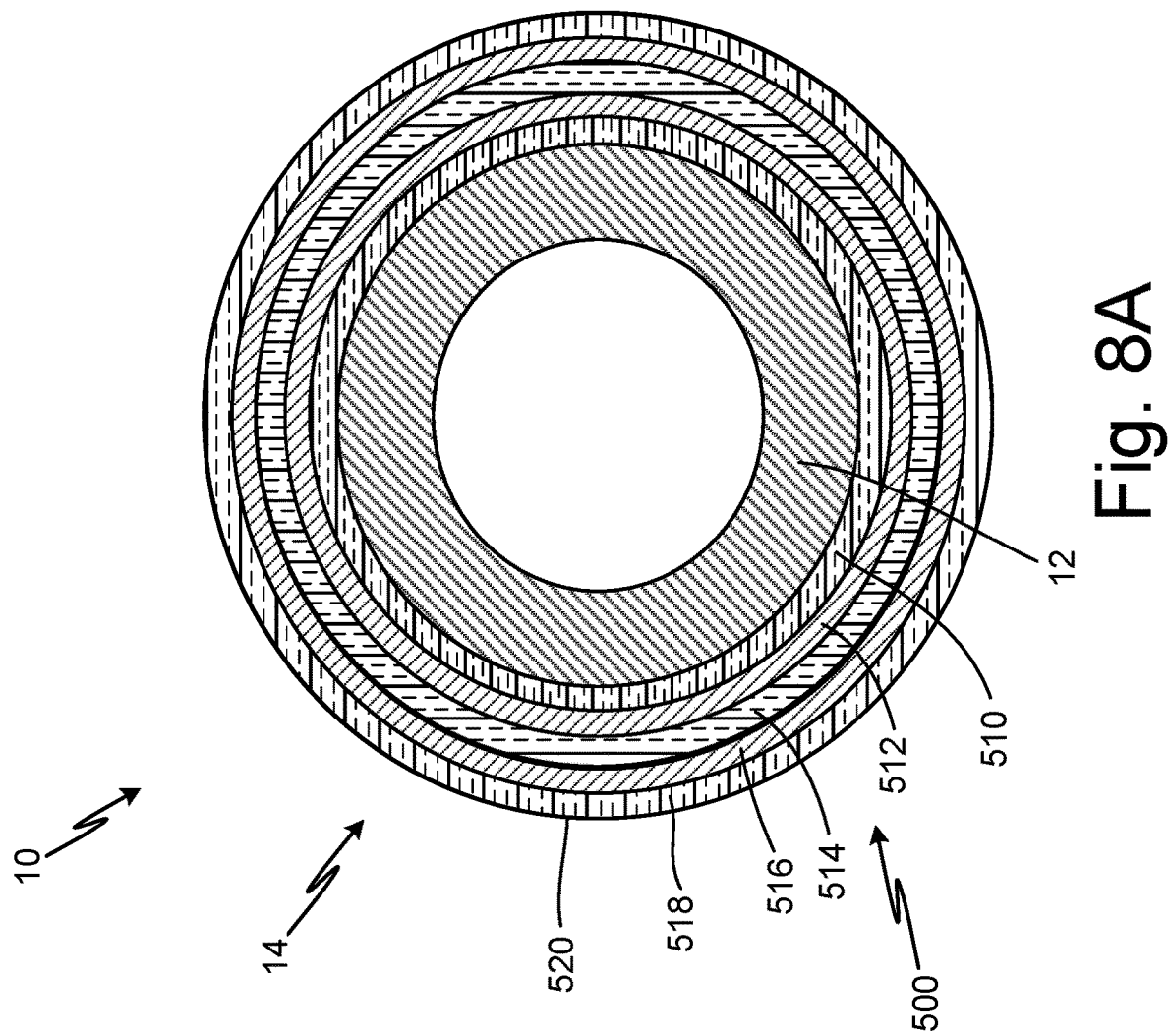

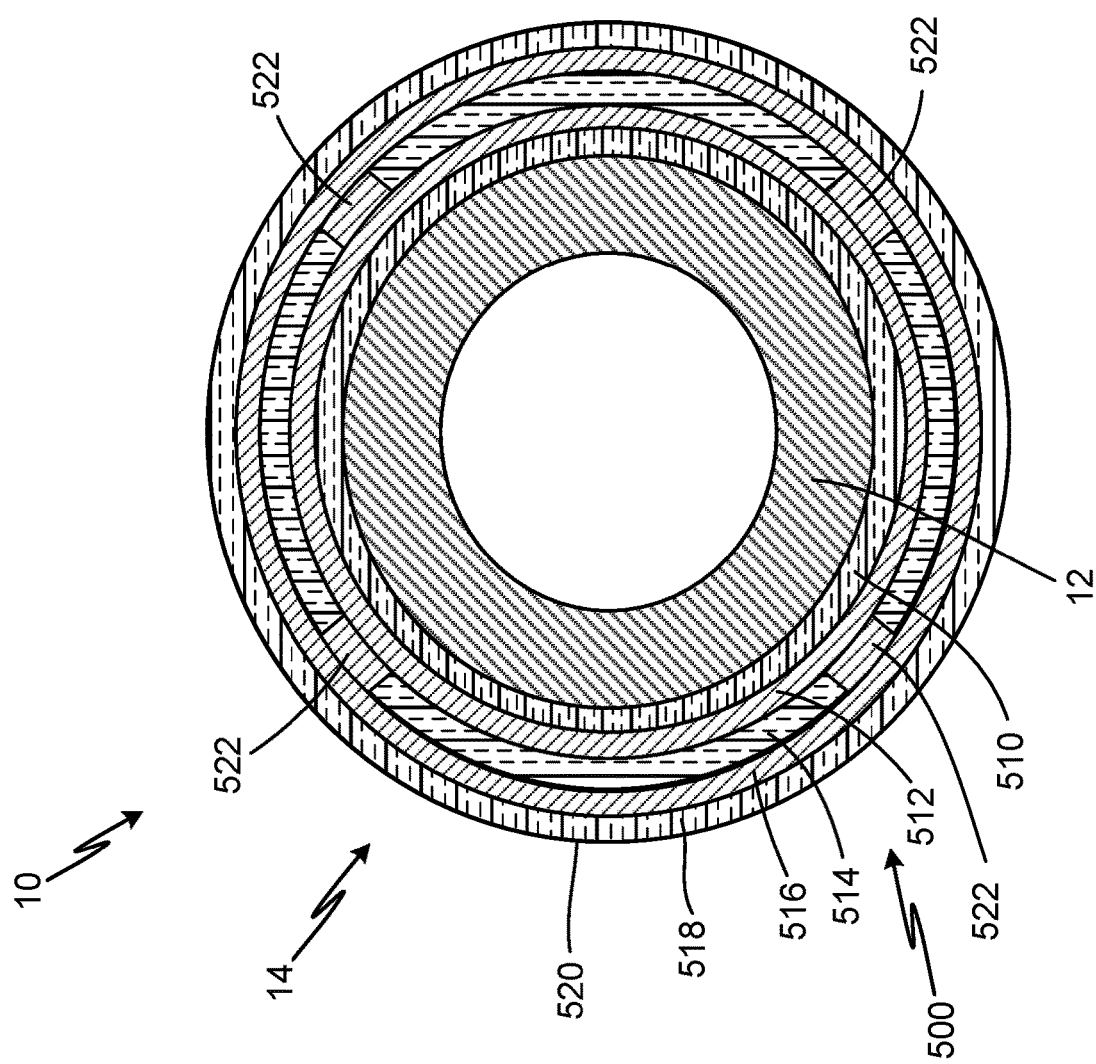

ADDITIVELY MANUFACTURED HEATERS FOR AIR DATA PROBES HAVING A HEATER LAYER AND A DIELECTRIC LAYER ON THE AIR DATA PROBE BODY

BACKGROUND

The present disclosure relates generally to air data probes, and in particular, to heaters for air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which are often cold. As such, heaters are positioned within air data probes to ensure the air data probes function properly in liquid water, ice crystal, and mixed phase icing conditions. It can be difficult to successfully arrange the heater within the air data probe.

SUMMARY

An air data probe includes an air data probe body and an additively manufactured heater on the air data probe body A method of forming a heater on an air data probe includes additively manufacturing a heater layer onto an air data probe and depositing a first dielectric layer onto the additively manufactured heater layer.

BRIEF DESCRIPTION OF THE DRAWINGS

FIG. 7 is a cross-sectional view of the probe head of the pitot probe showing a fourth embodiment of the heater.

FIG. 8A is a cross-sectional view of the probe head of the pitot probe showing a fifth embodiment of the heater.

FIG. 8B is a cross-sectional view of the probe head of the pitot probe showing the fifth embodiment of the heater having vias.

DETAILED DESCRIPTION

In general, the present disclosure describes a heater that is additively manufactured onto an air data probe to allow for variation of cross-sectional area, variation of material, and parallel arrangement of the heater in order to achieve desired watt densities in specified areas of the air data probe, or tailor heat distribution based on the region of the probe, and provide redundancy. As a result, heater installation is simplified, manufacturing flexibility is increased, and heater replacement is possible.

Figure 1:
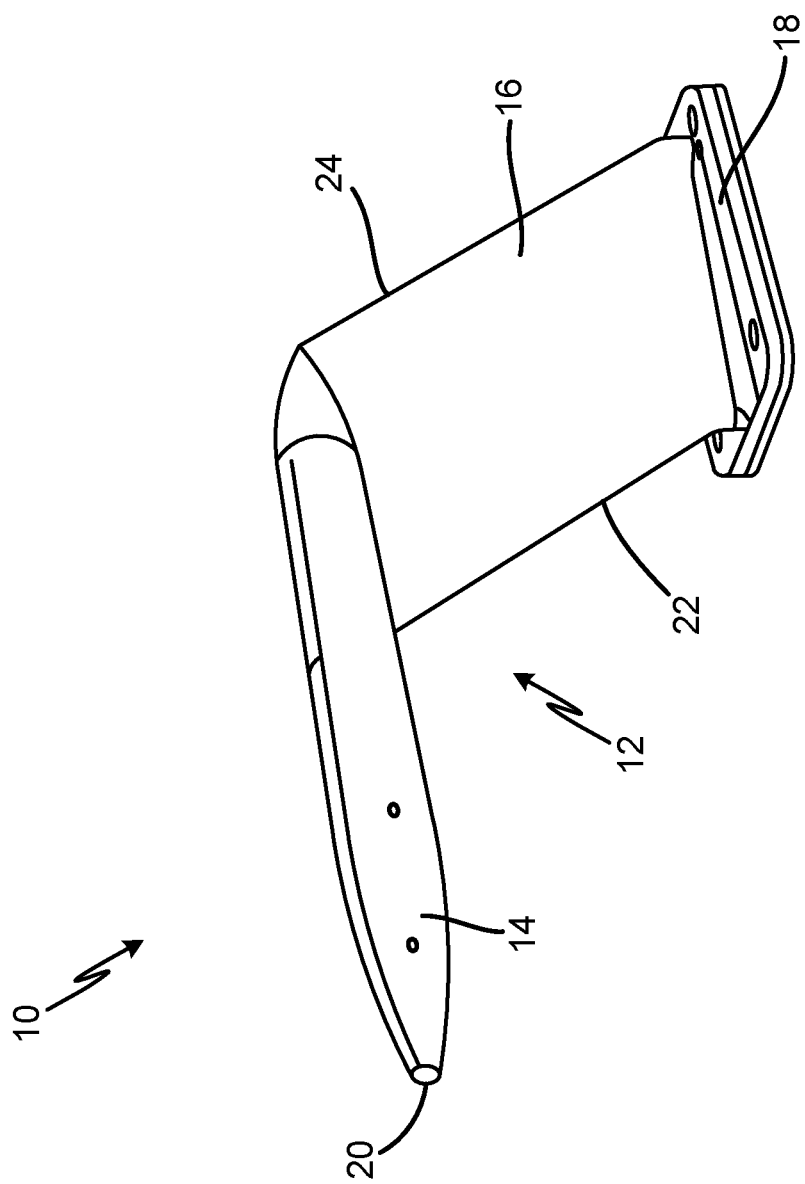
FIG. 1 is a perspective view of a pitot probe.
Figure 2:
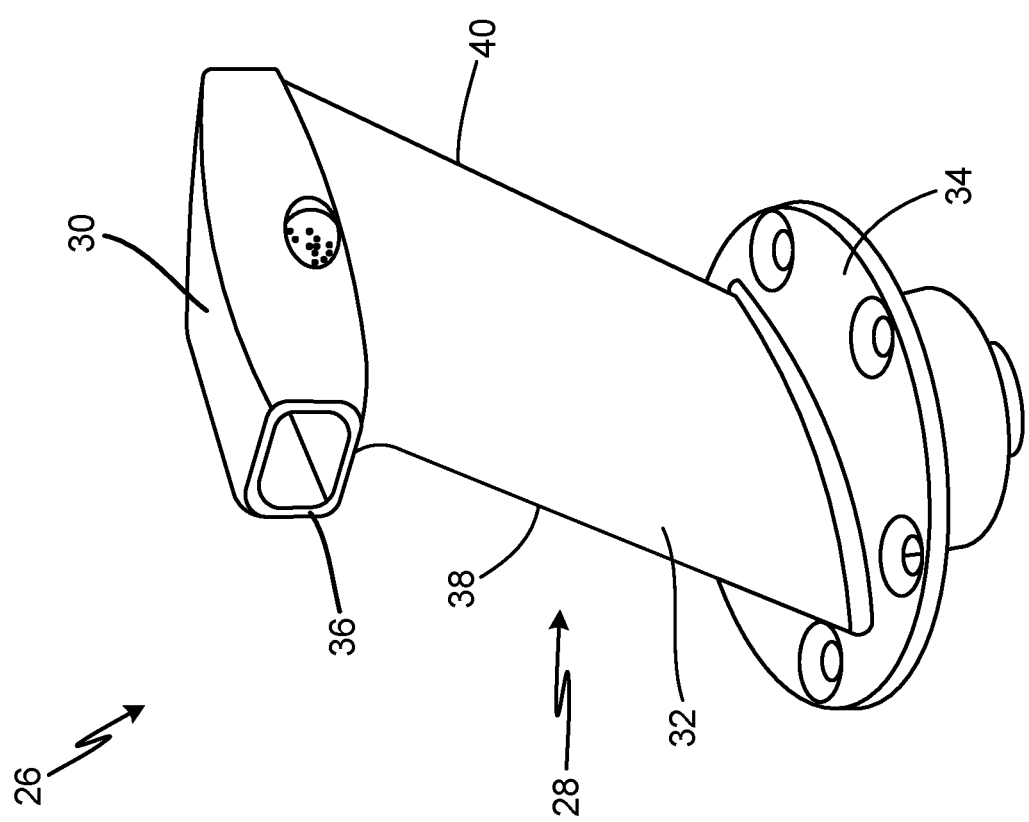
FIG. 2 is a perspective view of a total air temperature probe.
Figure 3:
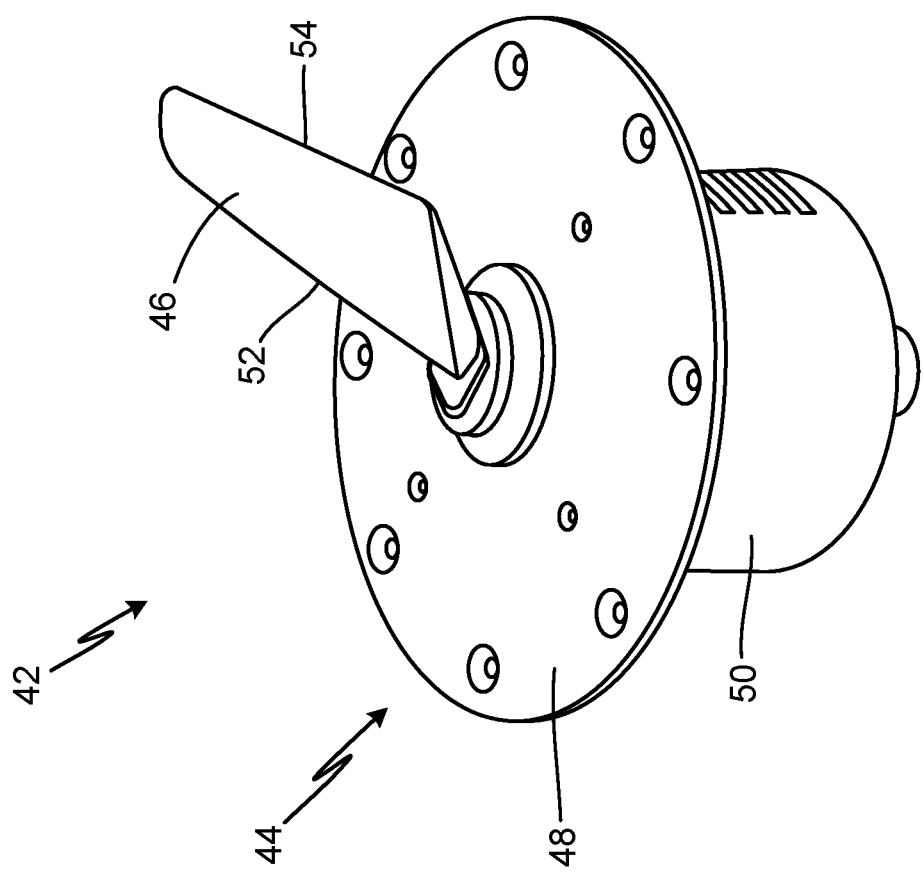
FIG. 3 is a perspective view of an angle of attack sensor.

The present disclosure relates to air data probes. FIGS. 1-3 illustrate examples of different air data probes. In FIG. 1, a pitot probe is discussed. In FIG. 2, a total air temperature probe is discussed. In FIG. 3, an angle of attack sensor is discussed. The present disclosure can be applied to any suitable air data probe.

FIG. 1 is a perspective view of pitot probe 10. Pitot probe 10 includes body 12, formed by probe head 14 and strut 16, and mounting flange 18. Probe head 14 includes tip 20. Strut 16 includes leading edge 22 and trailing edge 24.

Pitot probe 10 may be a pitot-static probe or any other suitable air data probe. Body 12 of pitot probe 10 is formed by probe head 14 and strut 16. Probe head 14 is the sensing head of pitot probe 10. Probe head 14 is a forward portion of pitot probe 10. Probe head 14 has one or more ports positioned in probe head 14. Internal components of pitot probe 10 are located within probe head 14. Probe head 14 is connected to a first end of strut 16. Probe head 14 and strut 16 make up body 12 of pitot probe 10. Strut 16 is blade-shaped. Internal components of pitot probe 10 are located within strut 16. Strut 16 is adjacent mounting flange 18. A second end of strut 16 is connected to mounting flange 18. Mounting flange 18 makes up a mount of pitot probe 10. Mounting flange 18 is connectable to an aircraft.

Probe head 14 has tip 20 at a forward, or upstream, portion of probe head 14. Tip 20 is at the end of probe head 14 opposite the end of probe head 14 connected to strut 16. Strut 16 has leading edge 22 at a forward, or upstream, side of strut 16 and trailing edge 24 at an aft, or downstream, side of strut 16. Leading edge 22 is opposite trailing edge 24.

Pitot probe 10 is configured to be installed on an aircraft. Pitot probe 10 may be mounted to a fuselage of the aircraft via mounting flange 18 and fasteners, such as screws or bolts. Strut 16 holds probe head 14 away from the fuselage of the aircraft to expose probe head 14 to external airflow. Probe head 14 takes in air from surrounding external airflow and communicates air pressures pneumatically through internal components and passages of probe head 14 and strut 16. Pressure measurements are communicated to a flight computer and can be used to generate air data parameters related to the aircraft flight condition.

FIG. 2 is a perspective view of total air temperature probe 26. Total air temperature probe 26 includes body 28, formed by head 30 and strut 32, and mounting flange 34. Head 30 includes inlet scoop 36. Strut 32 includes leading edge 38 and trailing edge 40.

Body 28 of total air temperature probe 26 is formed by head 30 and strut 32. Head 30 is connected to a first end of strut 32. Head 30 and strut 32 make up body 28 of total air temperature probe 26. Internal components of total air temperature probe 26 are located within strut 32. Strut 32 is adjacent mounting flange 34. A second end of strut 32 is connected to mounting flange 34. Mounting flange 34 makes up a mount of total air temperature probe 26. Mounting flange 34 is connectable to an aircraft.

Head 30 has inlet scoop 36, which is is a forward portion of total air temperature probe 26. Inlet scoop 36 is an opening in a forward, or upstream, end of head 30. Strut 32 has leading edge 38 at a forward, or upstream, side of strut 32 and trailing edge 40 at an aft, or downstream, side of strut 32. Leading edge 38 is opposite trailing edge 40.

Total air temperature probe 26 is configured to be installed on an aircraft. Total air temperature probe 26 may be mounted to a fuselage of the aircraft via mounting flange 34 and fasteners, such as screws or bolts. Strut 32 holds head 30 away from the fuselage of the aircraft to expose head 30 to external airflow. Air flows into total air temperature probe 26 through inlet scoop 36 of head 30. Air flows into an interior passage within strut 32 of total air temperature probe 26, where sensing elements measure the total air temperature of the air. Total air temperature measurements of the air are communicated to a flight computer. Such measurements can be used to generate air data parameters related to the aircraft flight condition.

FIG. 3 is a perspective view of angle of attack sensor 42. Angle of attack sensor 42 includes body 44, formed by vane 46 and faceplate 48, and housing 50. Vane 46 includes leading edge 52 and trailing edge 54.

Body 44 of angle of attack sensor 42 is formed by vane 46 and faceplate 48. Vane 46 is adjacent faceplate 48. Vane 46 and faceplate 48 make up body 44 of angle of attack sensor. Faceplate 48 makes up a mount of angle of attack sensor 42. Faceplate 48 is connectable to an aircraft. Faceplate 48 is positioned on and connected to housing 50. Internal components of angle of attack sensor 42 are located within housing 50. Vane 46 has leading edge 52 at a forward, or upstream, side of vane 46 and trailing edge 54 at an aft, or downstream, side of vane 46. Leading edge 52 is opposite trailing edge 54.

Angle of attack sensor 42 is installed on an aircraft. Angle of attack sensor 42 may be mounted to a fuselage of the aircraft via faceplate 48 and fasteners, such as screws or bolts. Vane 46 extends outside an exterior of the aircraft and is exposed to external airflow, and housing 50 extends within an interior of the aircraft. External airflow causes vane 46 to rotate with respect to faceplate 48 via a series of bearings within angle of attack sensor 42. Vane 46 rotates based on the angle at which the aircraft is flying relative to the external oncoming airflow. Vane 46 causes rotation of a vane base and vane shaft within housing 50. The vane shaft is coupled to a rotational sensor that measures the local angle of attack or angle of the airflow relative to the fixed aircraft structure. The measured angle of attack is communicated to a flight computer and can be used to generate air data parameters related to the aircraft flight condition.

Figure 4:
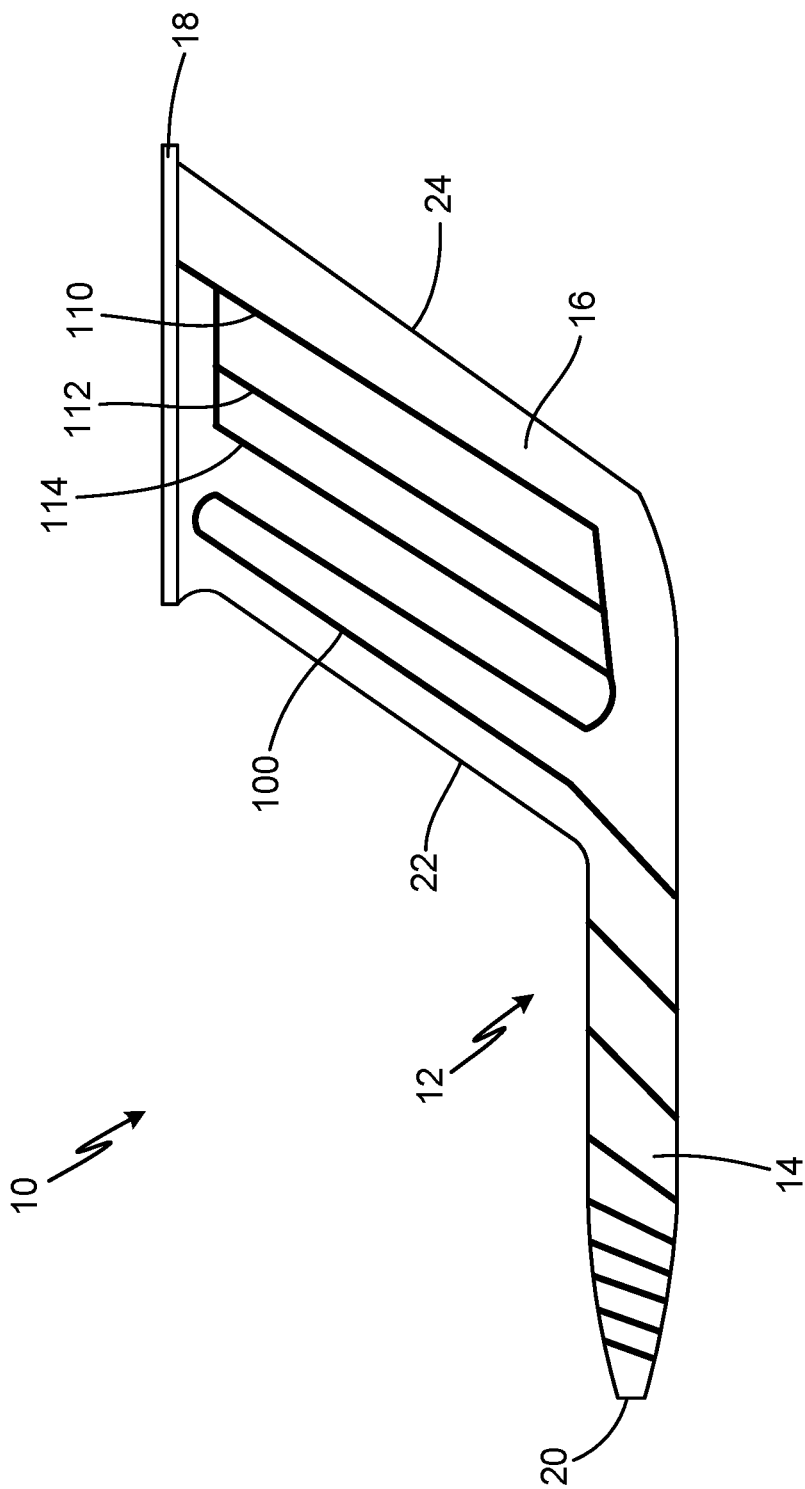
FIG. 4 is a schematic view of the pitot probe showing a first embodiment of an additively manufactured heater having parallel paths for trimming.

FIG. 4 is a schematic view of pitot probe 10 showing additively manufactured heater 100 having parallel paths 110, 112, and 114 for trimming. Pitot probe 10 includes body 12, formed by probe head 14 and strut 16, mounting flange 18, and heater 100. Probe head 14 includes tip 20. Strut 16 includes leading edge 22 and trailing edge 24. Heater 100 includes path 110, path 112, and path 114.

Pitot probe 10 has the same structure and function as described with respect to FIG. 1. In this embodiment, pitot probe 10 has heater 100. Heater 100 is on body 12 of pitot probe 10. Heater 100 extends along strut 16 and probe head 14. Heater 100 is additively manufactured onto body 12 of pitot probe 10. Body 12 of pitot probe 10 may be any formed using any manufacturing technique, such as casting or machining. Heater 100 may be additively manufactured using one or more of aerosol jet printing, plasma spraying, thermal spraying, sputtering, atomic layer deposition and any other suitable additive manufacturing technology. Additive manufacturing technology may be selected for additively manufacturing heater 100 based on desired resolution, material or materials being used to manufacture heater 100, and/or desired Watt density of heater 100 (based on desired temperature range in the area of pitot probe 10 in which heater 100 is being placed). For example, heater 100 may be additively manufactured to achieve Watt densities in excess of 20 Watts per square inch.

Paths 110, 112, and 114 are formed by heater 100. Path 110 is connected to a power source (not shown). Path 112 is adjacent and parallel to path 110. Path 114 is adjacent and parallel to path 112. Path 112 is between path 110 and 114. As such, paths 110, 112, and 114 make up a portion of heater 100 arranged on body 12 of strut 32 in a parallel pattern. Paths 110, 112, and 114 are restrictive heater paths that are electrically in parallel. In this embodiment, heater 100 has three parallel paths 110, 112, and 114. In alternate embodiments, heater 100 may have any number of parallel paths.

Pitot probe 10 is installed on an aircraft and subjected to icing conditions during flight. Heater 100 provides heat to pitot probe 10 to prevent and remove ice growth. Different regions of pitot probe 10 require different levels of heat.

Heater 100 can be trimmed to achieve a more precise desired resistance. To trim heater 100, path 112 and/or 114 can be cut open based on the desired power. For example, path 112 and path 114 can be cut open to achieve an increased resistance that will result in overall decreased power. The desired power will result in the desired Watt density of heater 100 in the area of paths 110, 112, and 114. Thus, heater 100 will provide the desired amount of heat in the area of paths 110, 112 and 114.

Traditionally, heaters are brazed or installed into or onto air data probes. As such, manufacturing limitations affect where and how heaters can be placed on the air data probe. For example, arranging heaters in a parallel configuration can be difficult. Additionally, brazed heaters cannot be trimmed once they are brazed to the air data probe as the heater is no longer accessible. Further, sections of brazed heaters cannot be repaired and instead require the entire heater to be replaced. Brazing is also a labor intensive and expensive process.

Additively manufactured heater 100 provides more flexibility with respect to where heater 100 is applied on pitot probe 10 and how much heat from heater 100 is applied in particular areas of pitot probe 10. First, heater 100 can be additively manufactured onto body 12 of pitot probe 10 only where heater 100 is needed. Second, heater 100 can have more parallel paths than a traditionally brazed heater because additively manufactured heater 100 can have a smaller cross-sectional area than a brazed heater. Heater 100 can also have more parallel paths because body 12 is more accessible for additively manufacturing heater 100 onto body 12 than it is for brazing a heater. As such, paths 110, 112, and 114 of heater 100 are easier to add to pitot probe 10. Third, heater 100 can be trimmed to a more precise resistance. More parallel paths 110, 112, 114 added to pitot probe 10 means the heat provided by heater 100 can be more precisely tailored based on the regions of pitot probe 10 on which heater 100 is placed, resulting in more efficient and effective heating and a more cost-efficient air data probe. Fourth, additively manufactured heater 100 can be trimmed after heater 100 has been placed onto pitot probe 10 and connected to a power source, allowing for more precise heat distribution. Additively manufactured heater 100 can also be repaired, or a section of heater 100 can be removed and reapplied, without requiring complete replacement of heater 100. Therefore, pitot probe 10 having additively manufactured heater 100 simplifies installation, is more cost-effective, and has a greater ability to distribute heat to where heat is needed on pitot probe 10.

Figure 5:
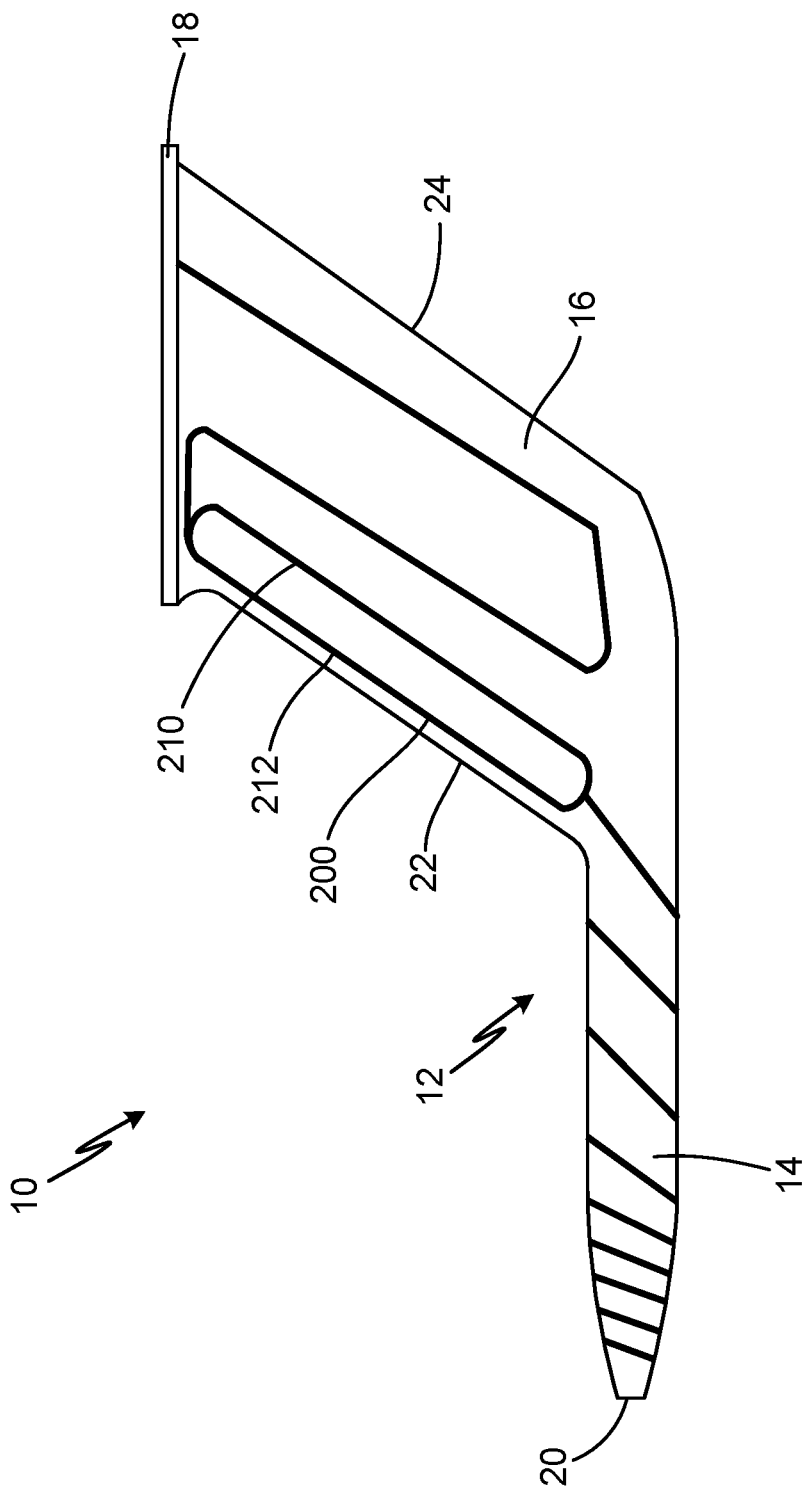
FIG. 5 is a schematic view of the pitot probe showing a second embodiment of the heater having parallel paths for redundancy.

FIG. 5 is a schematic view of pitot probe 10 showing heater 200 having parallel paths 210 and 212 for redundancy. Pitot probe 10 includes body 12, formed by probe head 14 and strut 16, mounting flange 18, and heater 200. Probe head 14 includes tip 20. Strut 16 includes leading edge 22 and trailing edge 24. Heater 200 includes path 210 and path 212.

Pitot probe 10 has the same structure and function as described with respect to FIG. 1. In this embodiment, pitot probe 10 has additively manufactured heater 200. Heater 200 has a similar structure and function as heater 100 described with respect to FIG. 4; however, heater 200 forms parallel paths 210 and 212 on body 12 of pitot probe 10 near leading edge 22. Path 210 is adjacent and parallel to path 212. Path 212 is adjacent leading edge 22. As such, paths 210 and 212 make up a portion of heater 200 arranged on body 12 of strut 32 in a parallel pattern. In this embodiment, heater 200 has two parallel paths 210 and 212. In alternate embodiments, heater 200 may have any number of parallel paths.

Heater 200 is additively manufactured to have parallel paths 210 and 212 in order to provide redundancy. Leading edge 22 is an area of pitot probe 10 more prone to ice accretion. Thus, leading edge 22 requires more heat from heater 200. As such, parallel paths 210 and 212 provide redundancy of heater 200 in a critical area, or an area prone to accrete ice. Therefore, heater 200 is more effective at delivering heat to leading edge 22, which prevents ice accretion and performance degradation of pitot probe 10.

Figure 6:
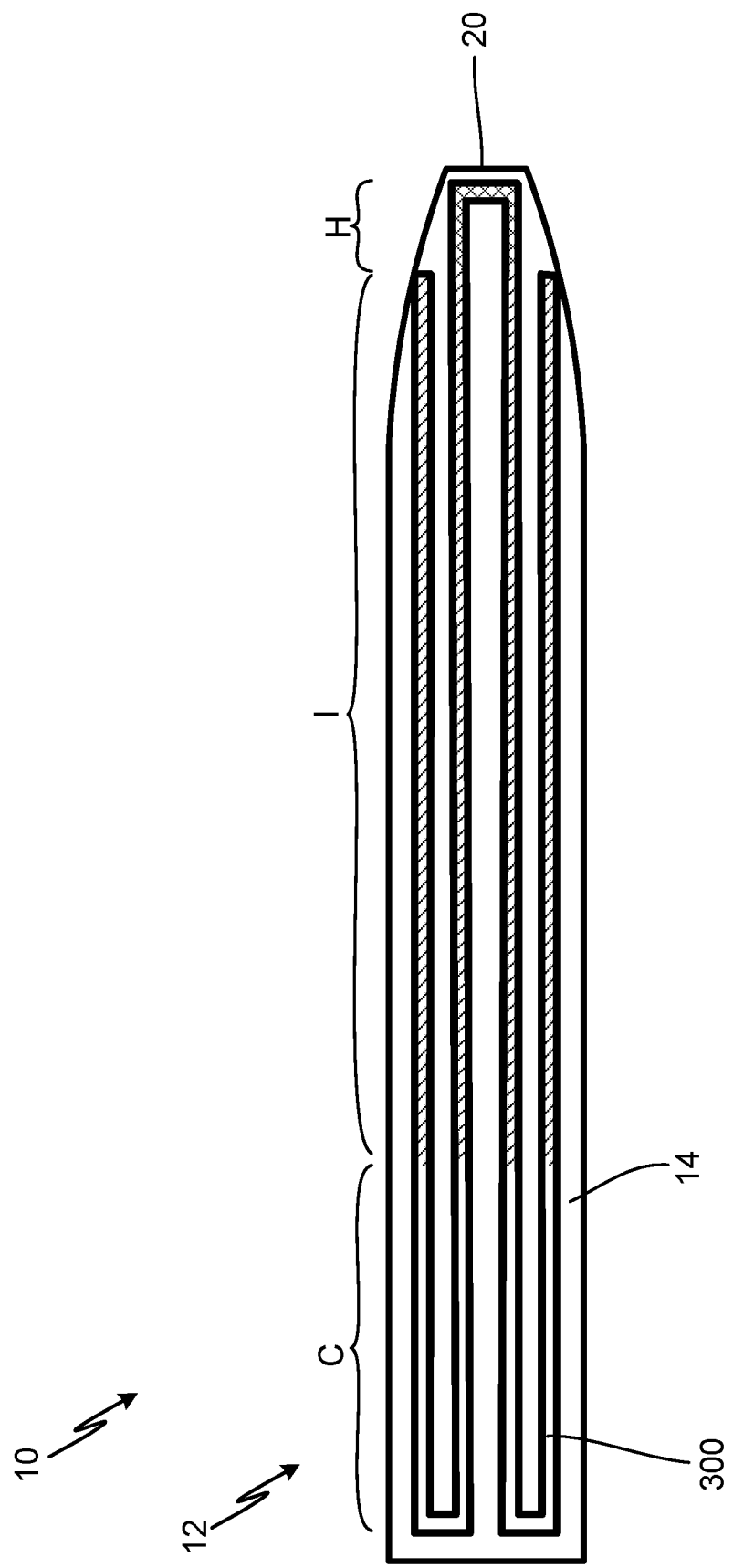
FIG. 6 is a schematic view of a probe head of the pitot probe showing a third embodiment of the heater having varied Watt density.

FIG. 6 is a schematic view of probe head 14 of pitot probe 10 showing heater 300 having varied Watt density. Pitot probe 10 includes body 12, formed by probe head 14 and strut 16 (shown in FIGS. 1, 4, and 5), and heater 200. Probe head 14 includes tip 20. Heater 300 includes cool region C, intermediate region I, and hot region H.

Pitot probe 10 has the same structure and function as described with respect to FIG. 1. In this embodiment, pitot probe 10 has additively manufactured heater 300. Heater 300 has a similar structure and function as heater 100 described with respect to FIG. 4 or heater 200 described with respect to FIG. 5; however, heater 300 does not necessarily have parallel paths and forms cool region C, intermediate region I, and hot region H. Cool region C is a portion of heater 300 that has a low Watt density, producing a small amount of, or less, heat. Cool region C may have a Watt density in the range of 0 to 30 Watts per square inch. Cool region C is at an end of probe head 14 opposite tip 20. Intermediate region I is a portion of heater 300 that has an intermediate Watt density, producing an intermediate amount of heat. Intermediate region I may have a Watt density in the range of 15 to 50 Watts per square inch. Intermediate region I is between ends of probe head 14. Hot region H is a portion of heater 300 that has a high Watt density, producing a large amount of, or the most, heat. Hot region H may have a Watt density in the range of 25-200 Watts per square inch. Hot region H is at tip 20 of probe head 14. As such, heater 300 has varied Watt density. In FIG. 6, the varied Watt density of heater 300 is shown in probe head 14. However, strut 16 may also have heater 300 with varied Watt density. For example, heater 300 at leading edge 22 of strut 16 may be a hot region H, or have a higher Watt density, while heater 300 at trailing edge 24 of strut 16 may be a cool region C, or have a lower Watt density. Heater 300 achieves a varied Watt density by varying spacing, material, cross-sectional area, and/or arrangement (in series or parallel) of heater 300 in different regions to result in higher or lower Watt density required for each region. For example, in cool region C, heater 300 is arranged such that heater 300 is in a spaced out configuration while in hot region H, heater 300 is arranged such that heater 300 is wrapped more tightly for a closer configuration. Additionally, additively manufactured heater 300 can have a smaller cross-sectional area, so heater 300 can be placed closer to tip 20, or other hot regions H.

Areas of pitot probe 10 that are prone to accreting ice require more heat and have hot region H of heater 300 applied thereto. Areas of pitot probe 10 that are less prone to accreting ice require less heat and have cool region C of heater 300 applied thereto. Areas of pitot probe 10 that are intermediate in their likelihood to accrete ice require an intermediate amount of heat and have intermediate region I of heater 300 applied thereto. For example, leading edge 22 of strut 16 and tip 20 of probe head 14 are more prone to accreting ice and require more heat from heater 300. Thus, hot region H of heater 300 is applied to leading edge 22 and tip 20. Further, trailing edge 24 of strut 16 is less prone to accreting ice and requires less heat from heater 300. Thus, cool region C of heater 300 is applied to trailing edge 24.

Thin film, cartridge, and cable style electrical heaters often present challenges in delivering heat to the most critical locations, such as tip 20 of pitot probe 10. Traditional heaters also present challenges in variation among the heater. Additively manufactured heater 300 can be varied to have the highest Watt density at, or deliver the most amount of heat to, hot regions H, such as tip 20. Because heater 300 is additively manufactured, varying the cross-sectional area, spacing, material, and arrangement is easier and results in varied Watt density, which allows for efficient heat distribution. Additively manufactured heater 300 can deliver various amounts of heat based on the heating needs of the regions of air data probe 10.

FIG. 7 is a cross-sectional view of probe head 14 of pitot probe 10 showing heater 400. Pitot probe 10 includes body 12, formed by probe head 14 and strut 16 (shown in FIGS. 1, 4, and 5), and heater 400. Heater 400 includes dielectric layer 410, heater layer 412, dielectric layer 414, and exterior surface 416.

Pitot probe 10 has the same structure and function as described with respect to FIG. 1. In this embodiment, pitot probe 10 has additively manufactured heater 400. Heater 400 has a similar structure and function as heater 100 described with respect to FIG. 4, heater 200 described with respect to FIG. 5, or heater 300 described with respect to FIG. 6; however, heater 400 has a stack-up including dielectric layer 410, heater layer 412, and dielectric layer 414.

In this embodiment, body 12 of pitot probe is metallic. Heater 400 is additively manufactured onto body 12. Dielectric layer 410 is on body 12. Dielectric layer 410 may be deposited onto body 12 using any suitable additive manufacturing technology. Dielectric layer 410 may be one or more of xylene resin, alumina, PEKK, aluminum nitride, or any other suitable dielectric material. Heater layer 412 is on dielectric layer 410 such that dielectric layer 410 is between body 12 and heater layer 412. Heater layer 412 may be deposited onto dielectric layer 410 using any suitable additive manufacturing technology. Heater layer 412 may be one or more of silver, copper, PTC, ruthenium, silver-palladium, platinum, tungsten, or any other suitable material. Dielectric layer 414 is on heater layer 412 such that heater layer 412 is between dielectric layer 410 and dielectric layer 414. In this embodiment, dielectric layer 414 makes up exterior surface 416 of heater 400. In alternate embodiments, heater 400 may comprise a stack up of any number of alternating dielectric layers and heater layers. Further, the stack up of dielectric layers 410 and 414 and heater layer 412 may vary along pitot probe 10. Dielectric layer 414 may be deposited onto heater layer 412 using any suitable additive manufacturing technology. Dielectric layer 414 may also be one or more of xylene resin, alumina, PEKK, aluminum nitride, or any other suitable dielectric material. Materials for dielectric layers 410 and 414 and heater layer 412 may be selected based on heating needs of a given region of pitot probe 10 or based on the additive manufacturing technology being used to apply heater 400 to body 12.

Dielectric layers 410 and 414 seal and encapsulate heater layer 412 to provide insulation for heater 400. Specifically, dielectric layer 410 provides insulation from body 12. Additively manufacturing heater 400 allows for variation in thickness and material of dielectric layers 410 and 414 and heater layer 412 to result in variation of Watt density for tailored heat distribution along pitot probe 10.

FIG. 8A is a cross-sectional view of probe head 14 of pitot probe 10 showing heater 500. FIG. 8B is a cross-sectional view of probe head 14 of pitot probe 10 showing heater 500 having vias 522. FIGS. 8A and 8B will be discussed together. Pitot probe 10 includes body 12, formed by probe head 14 and strut 16 (shown in FIGS. 1, 4, and 5), and heater 500. Heater 500 includes dielectric layer 510, heater layer 512, dielectric layer 514, heater layer 516, dielectric layer 518, exterior surface 520, and vias 522.

Pitot probe 10 has the same structure and function as described with respect to FIG. 1. In this embodiment, pitot probe 10 has additively manufactured heater 500. Heater 500 has a similar structure and function has heater 400 described with respect to FIG. 7; however, heater 400 has a stack-up including dielectric layer 510, heater layer 512, dielectric layer 514, heater layer 516, and dielectric layer 518.

In this embodiment, body 12 of pitot probe is metallic. Heater 500 is additively manufactured onto body 12. Dielectric layer 510 is on body 12. Heater layer 512 is on dielectric layer 510 such that dielectric layer 510 is between body 12 and heater layer 512. Dielectric layer 514 is on heater layer 512 such that heater layer 512 is between dielectric layer 510 and dielectric layer 514. Heater layer 516 is on dielectric layer 514 such that dielectric layer 514 is between heater layer 512 and heater layer 516. Heater layer 516 may be deposited onto dielectric layer 514 using any suitable additive manufacturing technology. Heater layer 516 may be one or more of silver, copper, PTC, ruthenium, silver-palladium, platinum, tungsten, or any other suitable material. Dielectric layer 518 is on heater layer 516 such that heater layer 516 is between dielectric layer 514 and dielectric layer 518. In this embodiment, dielectric layer 518 makes up exterior surface 520 of heater 500. In alternate embodiments, heater 500 may comprise a stack up of any number of alternating dielectric layers and heater layers. Further, the stack up of dielectric layers 510, 514, and 518 and heater layers 512 and 516 may vary along pitot probe 10. Dielectric layer 518 may be deposited onto heater layer 516 using any suitable additive manufacturing technology. Dielectric layer 518 may also be one or more of xylene resin, alumina, PEKK, aluminum nitride, or any other suitable dielectric material. Materials for dielectric layers 510, 514, and 518 and heater layers 512 and 516 may be selected based on heating needs of a given region of pitot probe 10 or based on the additive manufacturing technology being used to apply heater 500 to body 12.

In FIG. 8A, heater 500 does not include vias 522. FIG. 8B shows vias 522 as part of heater 500. In the embodiment of FIG. 8B, heater 500 has four vias 522. In alternate embodiments, heater 500 may have any number of vias 522. Vias 522 are positioned within dielectric layer 514 such that a first end of each via 522 contacts heater layer 512 and a second end of each via 522 contacts heater layer 516. As such, vias 522 connect heater layer 512 and heater layer 516 in parallel.

Dielectric layers 510 and 514 seal and encapsulate heater layer 512, and dielectric layers 514 and 518 seal and encapsulate heater layer 516 to provide insulation for heater 500. Specifically, dielectric layer 510 provides insulation from body 12. Additively manufacturing heater 500 allows for variation in thickness and material of dielectric layers 510, 514, and 518 and heater layers 512 and 516 to result in variation of Watt density for tailored heat distribution along pitot probe 10. Having multiple heater layers 512 and 516 allows for increased Watt density, resulting in increased heat in regions of pitot probe 10 more likely to accrete ice, such as tip 20. As shown in FIG. 8B, heater 500 may include vias 522 to connect heater layer 512 and heater layer 516 in parallel, which allows for damage tolerance.

Figure 9:
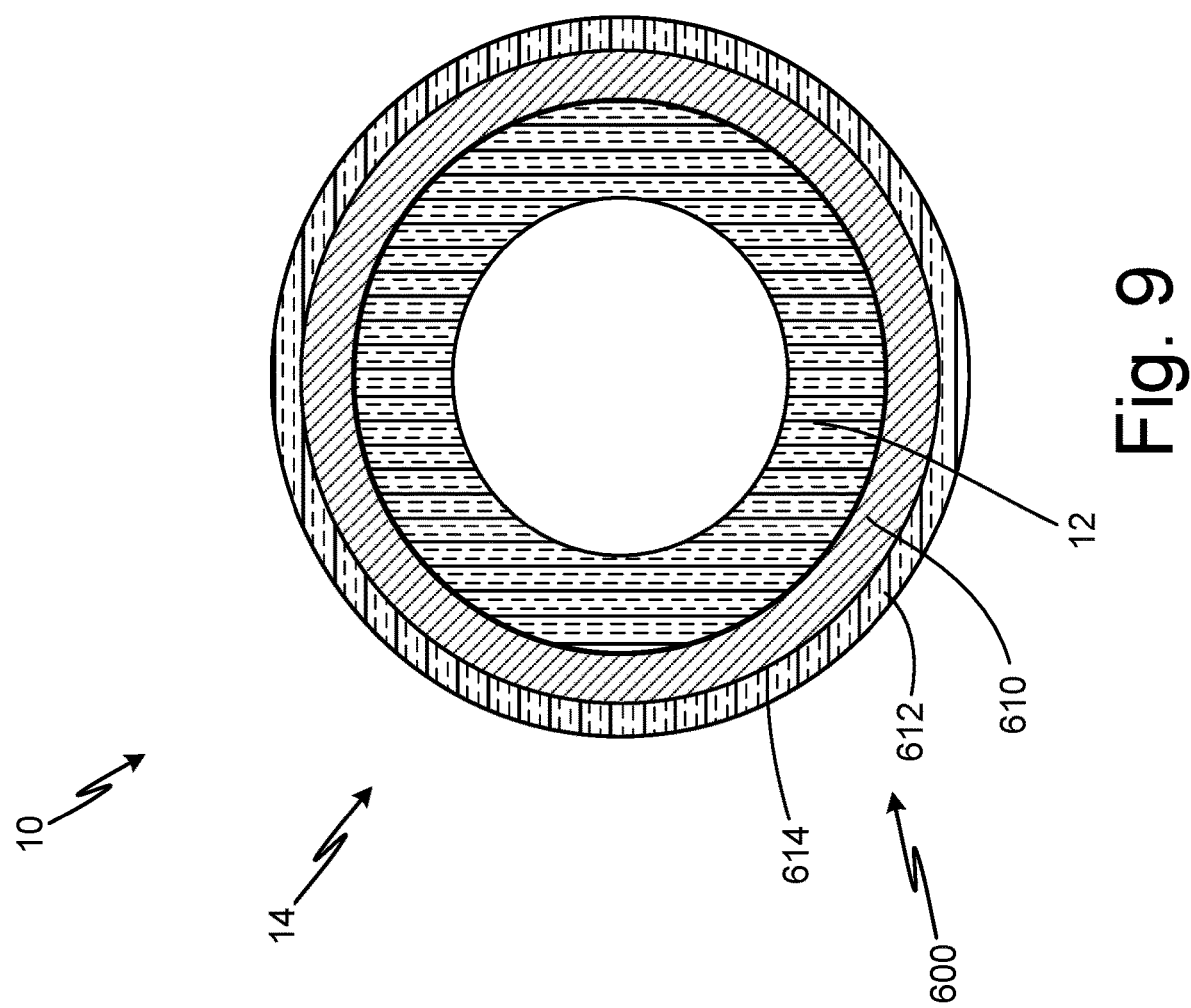
FIG. 9 is a cross-sectional view of the probe head of the pitot probe showing a sixth embodiment of the heater.

FIG. 9 is a cross-sectional view of probe head 14 of pitot probe 10 heater 600. Pitot probe 10 includes body 12 (which in this case is formed by a dielectric material), formed by probe head 14 and strut 16 (shown in FIGS. 1, 4, and 5), and heater 600. Heater 600 includes heater layer 610, dielectric layer 612, and exterior surface 614.

Pitot probe 10 has the same structure and function as described with respect to FIG. 1. In this embodiment, pitot probe 10 has additively manufactured heater 600. Heater 600 has a similar structure and function has heater 400 described with respect to FIG. 7; however, heater 600 has a stack-up including heater layer 610 and dielectric layer 612.

In this embodiment, body 12 of pitot probe is dielectric, or non-metallic. Heater 600 is additively manufactured onto body 12. Heater layer 610 is on body 12. Heater layer 610 may be deposited onto body 12 using any suitable additive manufacturing technology. Heater layer 610 may be one or more of silver, copper, PTC, ruthenium, silver-palladium, platinum, tungsten, or any other suitable material. Dielectric layer 612 is on heater layer 610 such that heater layer 610 is between body 12 and dielectric layer 612. In this embodiment, dielectric layer 612 makes up exterior surface 614 of heater 600. In alternate embodiments, heater 600 may comprise a stack up of any number of alternating heater layers and dielectric layers. Further, the stack up of heater layer 610 and dielectric layer 612 may vary along pitot probe 10. Dielectric layer 612 may be deposited onto heater layer 610 using any suitable additive manufacturing technology. Dielectric layer 612 may be one or more of xylene resin, alumina, PEKK, aluminum nitride, or any other suitable dielectric material. Materials for heater layer 610 and dielectric layer 612 may be selected based on heating needs of a given region of pitot probe 10 or based on the additive manufacturing technology being used to apply heater 600 to body 12.

Dielectric body 12 and dielectric layer 612 seal and encapsulate heater layer 610 to provide insulation for heater 600. Additively manufacturing heater 600 allows for variation in thickness and material of heater layer 610 and dielectric layer 612 to result in variation of Watt density for tailored heat distribution along pitot probe 10. Additionally, performance of heater 600 does not rely on the thermal conductivity of body 12 of pitot probe 10.

Figure 10A:
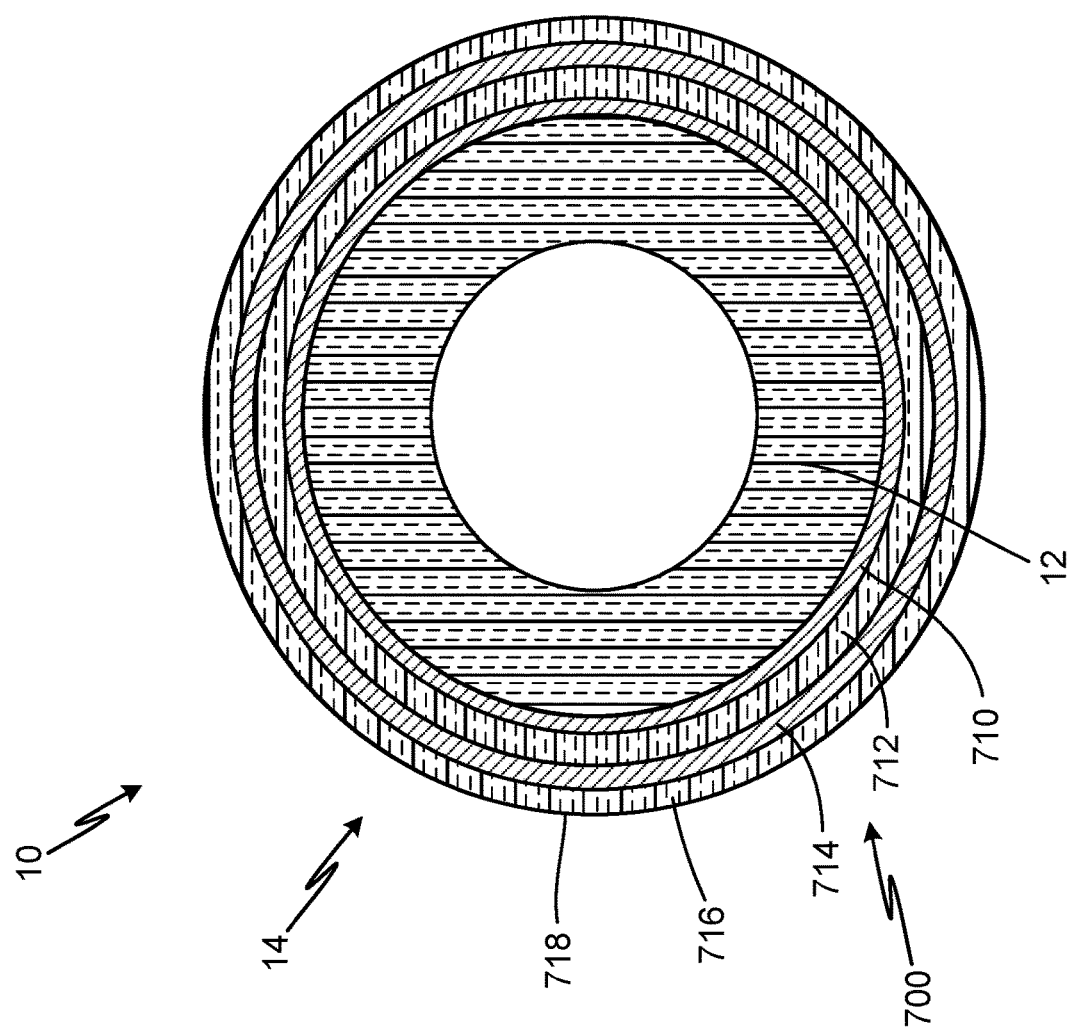
FIG. 10A is a cross-sectional view of the probe head of the pitot probe showing a seventh embodiment of the heater.
Figure 10B:
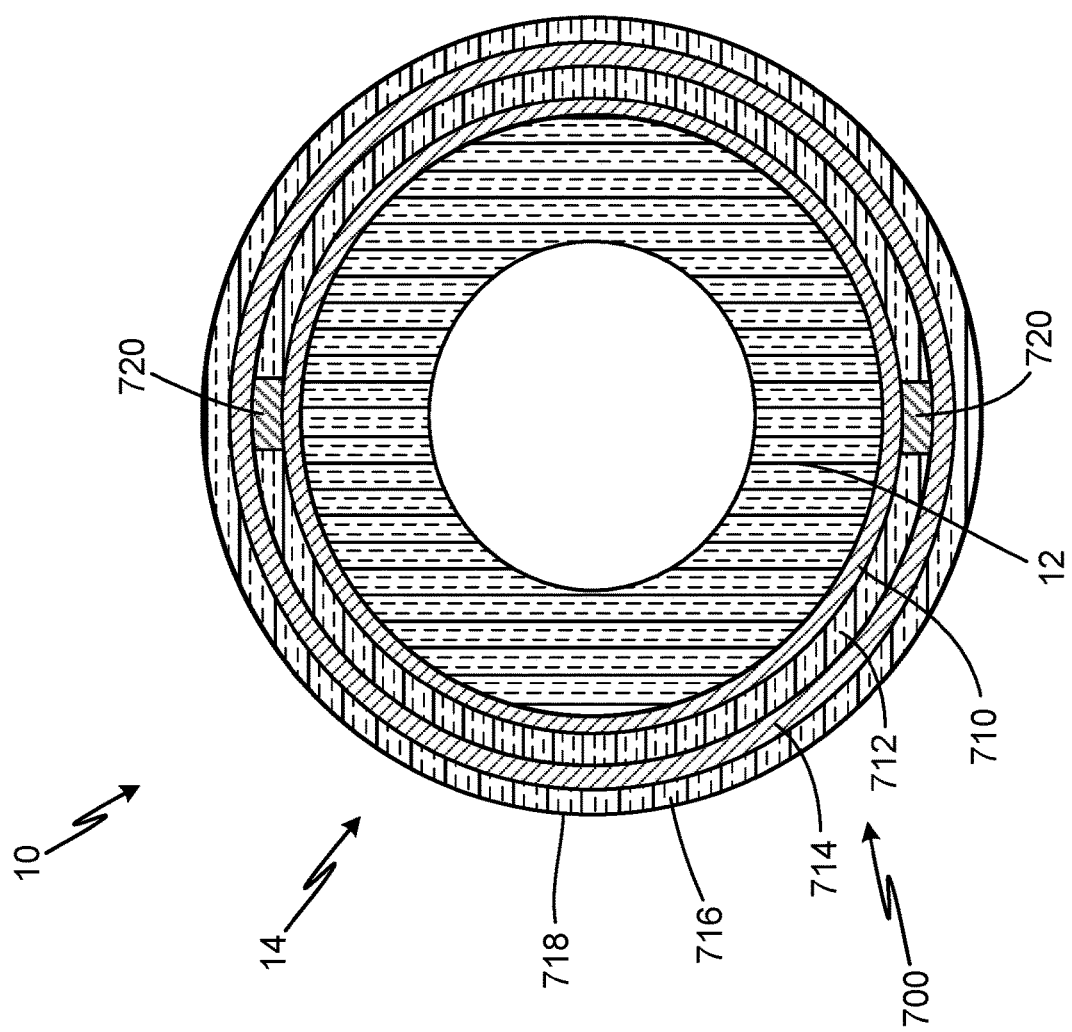
FIG. 10B is a cross-sectional view of the probe head of the pitot probe showing the seventh embodiment of the heater having vias.

FIG. 10A is a cross-sectional view of probe head 14 of pitot probe 10 showing heater 700. FIG. 10B is a cross-sectional view of probe head 14 of pitot probe 10 showing heater 700 having vias 720. FIGS. 10A and 10B will be discussed together. Pitot probe 10 includes body 12 (which in this case is formed by a dielectric material), formed by probe head 14 and strut 16 (shown in FIGS. 1, 4, and 5), and heater 700. Heater 700 includes heater layer 710, dielectric layer 712, heater layer 714, dielectric layer 716, exterior surface 718, and vias 720.

Pitot probe 10 has the same structure and function as described with respect to FIG. 1. In this embodiment, pitot probe 10 has additively manufactured heater 700. Heater 700 has a similar structure and function has heater 600 described with respect to FIG. 9; however, heater 700 has a stack-up including heater layer 710, dielectric layer 712, heater layer 714, dielectric layer 716.

In this embodiment, body 12 of pitot probe is dielectric, or non-metallic. Heater 700 is additively manufactured onto body 12. Heater layer 710 is on body 12. Dielectric layer 712 is on heater layer 710 such that heater layer 710 is between body 12 and dielectric layer 712. Heater layer 714 is on dielectric layer 712 such that dielectric layer 712 is between heater layer 710 and heater layer 714. Heater layer 714 may be deposited onto dielectric layer 712 using any suitable additive manufacturing technology. Heater layer 714 may be one or more of silver, copper, PTC, ruthenium, silver-palladium, platinum, tungsten, or any other suitable material. Dielectric layer 716 is on heater layer 714 such that heater layer 714 is between dielectric layer 712 and dielectric layer 716. In this embodiment, dielectric layer 716 makes up exterior surface 718 of heater 700. In alternate embodiments, heater 700 may comprise a stack up of any number of alternating heater layers and dielectric layers. Further, the stack up of heater layers 710 and 714 and dielectric layers 712 and 716 may vary along pitot probe 10. Dielectric layer 716 may be deposited onto heater layer 714 using any suitable additive manufacturing technology. Dielectric layer 716 may be one or more of xylene resin, alumina, PEKK, aluminum nitride, or any other suitable dielectric material. Materials for heater layers 710 and 714 and dielectric layers 712 and 716 may be selected based on heating needs of a given region of pitot probe 10 or based on the additive manufacturing technology being used to apply heater 700 to body 12.

In FIG. 10A, heater 700 does not include vias 720. FIG. 10B shows vias 720 as part of heater 700. In the embodiment of FIG. 10B, heater 700 has two vias 720. In alternate embodiments, heater 700 may have any number of vias 720. Vias 720 are positioned within dielectric layer 712 such that a first end of each via 720 contacts heater layer 710 and a second end of each via 720 contacts heater layer 714. As such, vias 720 connect heater layer 710 and heater layer 714 in parallel.

Dielectric body 12 and dielectric layer 712 seal and encapsulate heater layer 710, and dielectric layer 712 and 716 seal and encapsulate heater layer 714 to provide insulation for heater 700. Additively manufacturing heater 700 allows for variation in thickness and material of heater layers 710 and 714 and dielectric layers 712 and 718 to result in variation of Watt density for tailored heat distribution along pitot probe 10. Additionally, performance of heater 700 does not rely on the thermal conductivity of body 12 of pitot probe 10. Having multiple heater layers 710 and 714 allows for increased Watt density, resulting in increased heat in regions of pitot probe 10 more likely to accrete ice, such as tip 20. As shown in FIG. 10B, heater 700 may include vias 720 to connect heater layer 710 and heater layer 714 in parallel, which allows for damage tolerance.

Figure 11:
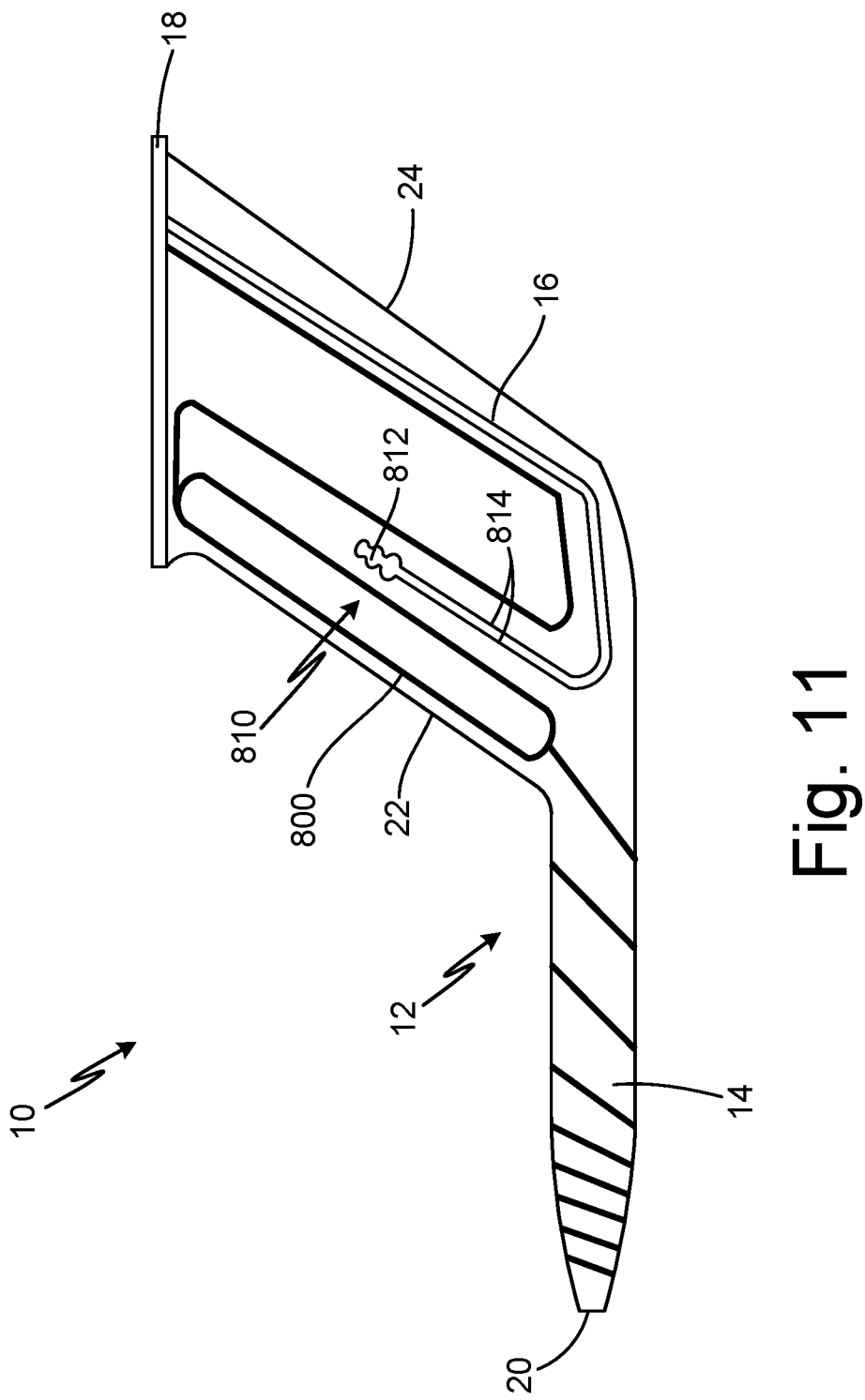
FIG. 11 is a schematic view of the pitot probe showing an eighth embodiment of the heater adjacent an additively manufactured temperature sensor.

FIG. 11 is a schematic view of pitot probe 10 showing heater 800 adjacent additively manufactured temperature sensor 810. Pitot probe 10 includes body 12, formed by probe head 14 and strut 16, mounting flange 18, heater 800, and temperature sensor 810. Probe head 14 includes tip 20. Strut 16 includes leading edge 22 and trailing edge 24. Temperature sensor 810 includes sensor 812 and conductive lines 814.

Pitot probe 10 has the same structure and function as described with respect to FIG. 1. In this embodiment, pitot probe 10 has additively manufactured heater 800 and temperature sensor 810. In this embodiment, heater 800 has the same structure and function as heater 200 described with respect to FIG. 5. In alternate embodiments, heater 800 may have the same structure and function as any of heaters 100, 300, 400, 500, 600, 700 or any other suitable heater. Temperature sensor 810 is adjacent heater 800. Temperature sensor 810 is additively manufactured onto body 12. Temperature sensor 810 may be one or more of silver, copper, PTC, ruthenium, silver-palladium, platinum, tungsten, or any other suitable material. Temperature sensor 810 is parallel to heater 800 but is not attached to heater 800.

Temperature sensor 810 has sensor 812 connected to conductive lines 814. Sensor 812 is adjacent heater 800 and conductive lines 814 are adjacent and parallel to heater 800. Sensor 812 and conductive lines 814 are spaced from heater 800 such that temperature sensor 810 does not electrically connect to heater 800. In this embodiment, sensor 812 is on strut 16. In alternate embodiments, sensor 812 may be in any location on pitot probe 10, such as probe head 14.

Sensor 812 of temperature sensor 810 changes resistance based on temperature. Conductive lines 814 deliver the resistance of sensor 812 to internal components of pitot probe 10 for determining the temperature at the location of sensor 812. Additively manufacturing temperature sensor 810 allows temperature sensor 810 to be placed in more locations, including locations that are difficult to access. For example, sensor 812 may be placed at tip 20. As such, temperature sensor 810 allows for measurement of temperature at specific locations within pitot probe 10, preventing overheating and reducing corrosion of heater 800. Additively manufactured temperature sensor 810 also simplifies installation and is more cost-effective.

Figure 12:
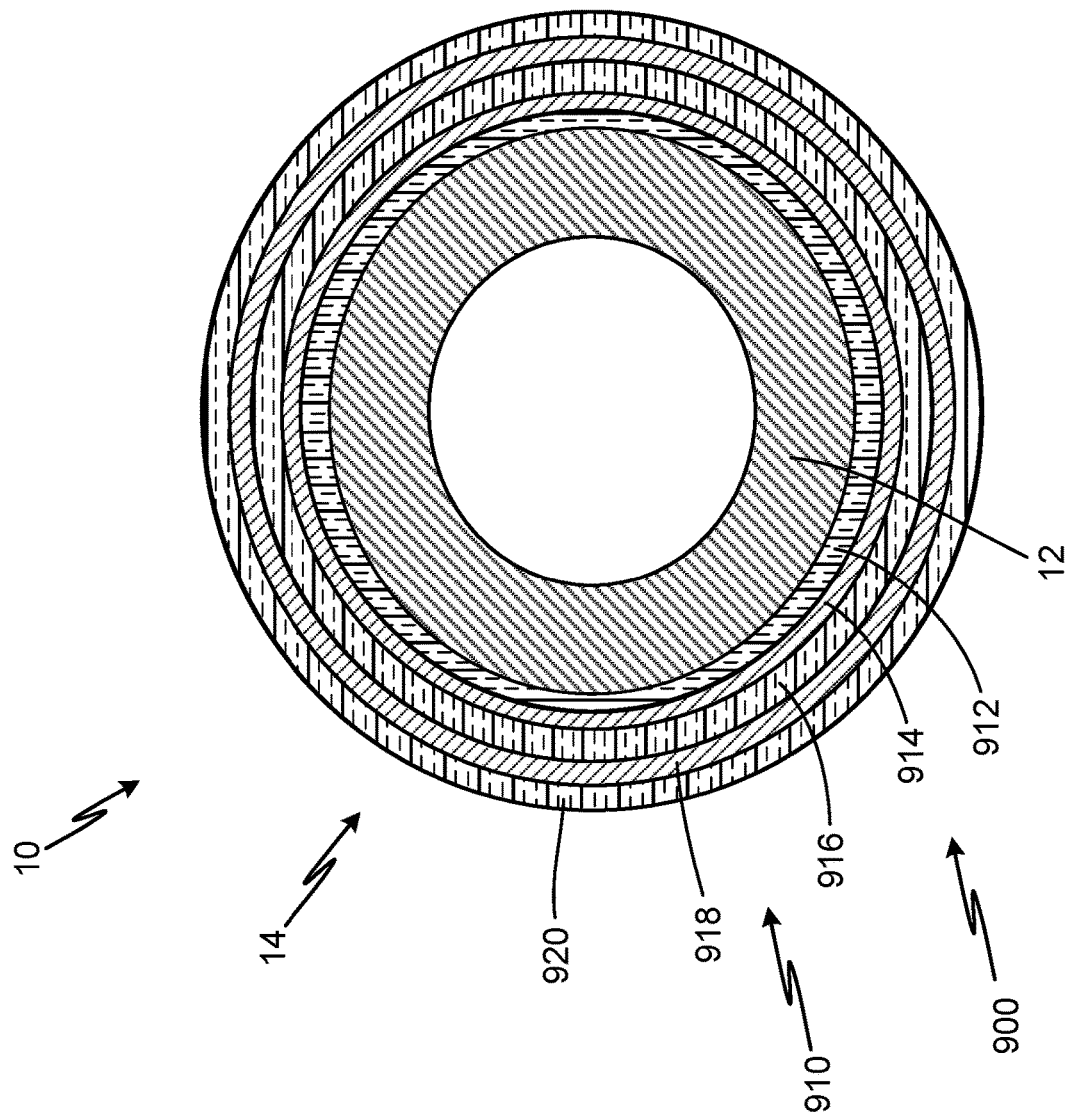
FIG. 12 is a cross-sectional view of the probe head of the pitot probe showing a ninth embodiment of the heater with an additively manufactured temperature sensor on heater.

FIG. 12 is a cross-sectional view of probe head 14 of pitot probe 10 showing heater 900 with additively manufactured temperature sensor 910 on heater 900. Pitot probe 10 includes body 12, formed by probe head 14 and strut 16 (shown in FIGS. 1, 4, and 5), heater 900 and temperature sensor 910. Heater 900 includes dielectric layer 912, heater layer 914, and dielectric layer 916. Temperature sensor 910 includes sensor layer 918 and dielectric layer 920.

Pitot probe 10 has the same structure and function as described with respect to FIG. 1. In this embodiment, pitot probe 10 has additively manufactured heater 900 and additively manufactured temperature sensor 910. Heater 900 has the same structure and function as heater 400 described with respect to FIG. 7; however temperature sensor 910 is additively manufactured on heater 900. Temperature sensor 910 has a similar structure and function as temperature sensor 810; however, temperature sensor 910 is on heater 900 and has a stack-up including sensor layer 918 and dielectric layer 920.

In this embodiment, body 12 of pitot probe is metallic. Heater 900 is additively manufactured onto body 12. Dielectric layer 912 is on body 12. Heater layer 914 is on dielectric layer 912 such that dielectric layer 912 is between body 12 and heater layer 914. Dielectric layer 916 is on heater layer 914 such that heater layer 914 is between dielectric layer 912 and dielectric layer 916. Sensor layer 918 of temperature sensor 910 is on dielectric layer 916 of heater 900 such that dielectric layer 916 is between heater layer 914 and sensor layer 918. Sensor layer 918 may be deposited onto dielectric layer 916 using any suitable additive manufacturing technology. Sensor layer 918 may be on ore more of silver, copper, PTC, ruthenium, silver-palladium, platinum, tungsten, or any other suitable material. Dielectric layer 920 is on sensor layer 918 such that sensor layer 918 is between dielectric layer 916 and dielectric layer 920. Dielectric layer 920 may be deposited onto sensor layer 918 using any suitable additive manufacturing technology. Dielectric layer 920 may also be one or more of xylene resin, alumina, PEKK, aluminum nitride, or any other suitable dielectric material. Materials for sensor layer 918 and dielectric layer 920 may be selected based temperatures in a given region of pitot probe 10 or based on the additive manufacturing technology being used to apply temperature sensor 910 to heater 900. In alternate embodiments, heater 900 may have any number of heater layers between dielectric layers. In this embodiment, temperature sensor 910 is exterior to heater 900. In alternate embodiments, temperature sensor 910 may be interior to or within heater 900 with sensor layer 918 being between dielectric layers of heater 900 and/or temperature sensor 910.

Dielectric layers 916 and 920 seal and encapsulate sensor layer 918, to provide temperature sensing abilities for pitot probe 10. Additively manufacturing temperature sensor 910 onto heater 900 allows for temperature measurement at specific locations within pitot probe 10 and simplifies installation.

FIGS. 1-3 illustrate different types of air data probes on which additively manufactured heaters 100, 200, 300, 400, 500, 600, 700, 800, and 900 can be applied. While heaters 100, 200, 300, 400, 500, 600, 700, 800, and 900 have been discussed with respect to pitot probe 10, additively manufactured heaters 100, 200, 300, 400, 500, 600, 700, 800, and 900 can be applied to any air data probe, including pitot probe 10, total air temperature probe 26, angle of attack sensor 42, an ice detector, a drain mast, or any other suitable air data probe. Further, any combination of additively manufactured heaters 100, 200, 300, 400, 500, 600, 700, 800, and 900 may comprise a heater for an air data probe.

Discussion of Possible Embodiments

The following are non-exclusive descriptions of possible embodiments of the present invention.

An air data probe includes an air data probe body; and an additively manufactured heater on the air data probe body.

The air data probe of the preceding paragraph can optionally include, additionally and/or alternatively, any one or more of the following features, configurations and/or additional components:

The air data probe body is non-metallic and the heater comprises: a first heater layer on the air data probe body; and a first dielectric layer on the first heater layer.

The first dielectric layer is made of xylene resin, alumina, PEKK, or aluminum nitride.

The heater layer is made of one or more materials selected from the group consisting of: silver, copper, PTC, ruthenium, silver-palladium, platinum, and tungsten.

The heater layer is made of a first material and a second material.

The heater further comprises: a second heater layer on the first dielectric layer such that the first dielectric layer is between the first heater layer and the second heater layer; and a second dielectric layer on the second heater layer.

The second dielectric layer makes up an exterior surface of the heater.

The air data probe body is metallic and the heater comprises: a first dielectric layer on the air data probe body; a first heater layer on the first dielectric layer; and a second dielectric layer on the first heater layer such that the first heater layer is between the first dielectric layer and the second dielectric layer.

The first dielectric layer is made of xylene resin, alumina, PEKK, or aluminum nitride.

The heater layer is made of one or more materials selected from the group consisting of: silver, copper, PTC, ruthenium, silver-palladium, platinum, and tungsten.

The heater layer is made of a first material and a second material.

The heater further comprises: a second heater layer on the second dielectric layer; and a third dielectric layer on the second heater layer.

A portion of the heater includes restrictive heater paths that are electrically in parallel for trimming or redundancy.

The heater has varied Watt density.

The heater has a varied cross-sectional area.

A method of forming a heater on an air data probe includes additively manufacturing a heater layer onto an air data probe; and depositing a first dielectric layer onto the additively manufactured heater layer.

The method of the preceding paragraph can optionally include, additionally and/or alternatively, any one or more of the following features, configurations and/or additional components:

Trimming the heater.

The heater layer is additively manufactured onto an air data probe body of the air data probe.

The heater layer is additively manufactured onto a second dielectric layer on an air data probe body of the air data probe such that the heater layer is between the first dielectric layer and the second dielectric layer.

The heater is additively manufactured using a technology selected from the group consisting of: aerosol jet printing, plasma spraying, thermal spraying, sputtering, and atomic layer deposition.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
an air data probe body; and
an additively manufactured heater on the air data probe body, the heater comprising:

a first heater layer on the air data probe body;
a first dielectric layer on the first heater layer;
a second heater layer on the first dielectric layer such that the first dielectric layer is between the first heater layer and the second heater layer; and
a second dielectric layer on the second heater layer;
wherein the air data probe body is non-metallic.

2. The air data probe of claim 1, wherein the first dielectric layer is made of xylene resin, alumina, PEKK, or aluminum nitride.

3. The air data probe of claim 1, wherein the first heater layer is made of one or more materials selected from the group consisting of: silver, copper, PTC, ruthenium, silver-palladium, platinum, and tungsten.

4. The air data probe of claim 1, wherein the first heater layer is made of a first material and a second material.

5. The air data probe of claim 1, wherein the second dielectric layer makes up an exterior surface of the heater.

6. The air data probe of claim 1, wherein the heater has varied Watt density.

7. The air data probe of claim 1, wherein the heater has a varied cross-sectional area.

8. An air data probe comprising:
an air data probe body; and
an additively manufactured heater on the air data probe body, the heater comprising:
a first dielectric layer on the air data probe body;
a first heater layer on the first dielectric layer;
a second dielectric layer on the first heater layer such that the first heater layer is between the first dielectric layer and the second dielectric layer;
a second heater layer on the second dielectric layer; and
a third dielectric layer on the second heater layer;
wherein the air data probe body is metallic.

9. The air data probe of claim 8, wherein the first dielectric layer is made of xylene resin, alumina, PEKK, or aluminum nitride.

10. The air data probe of claim 8, wherein the first heater layer is made of one or more materials selected from the group consisting of: silver, copper, PTC, ruthenium, silver-palladium, platinum, and tungsten.

11. The air data probe of claim 8, wherein the first heater layer is made of a first material and a second material.

12. An air data probe comprising:
an air data probe body; and
an additively manufactured heater on the air data probe body;
wherein a portion of the heater includes restrictive heater paths that are electrically in parallel for trimming or redundancy.

* * * * *